(12) United States Patent
Chiang et al.

(10) Patent No.: US 7,534,416 B2
(45) Date of Patent: May 19, 2009

(54) ANTIREFLECTIVE TRANSPARENT ZEOLITE HARDCOAT, METHOD FOR FABRICATING THE SAME

(75) Inventors: Anthony Shiaw-Tseh Chiang, Taoyuan County (TW); Shih-Ming Chen, Hsinchu (TW); Young-Jen Lee, Changhua County (TW)

(73) Assignees: Industrial Technology Research Institute, Hsinchu (TW); National Central University, Jhongli, Taoyuan County (TW)

( * ) Notice: Subject to any disclaimer, the term of this patent is extended or adjusted under 35 U.S.C. 154(b) by 0 days.

(21) Appl. No.: 12/081,466

(22) Filed: Apr. 16, 2008

(65) Prior Publication Data

US 2008/0196624 A1 Aug. 21, 2008

Related U.S. Application Data

(62) Division of application No. 11/300,331, filed on Dec. 15, 2005, now Pat. No. 7,381,461.

(30) Foreign Application Priority Data

Jul. 13, 2005 (TW) .............................. 94123697 A

(51) Int. Cl.
C01B 39/04 (2006.01)
(52) U.S. Cl. ...................... 423/702; 423/707
(58) Field of Classification Search ............... 423/702, 423/707
See application file for complete search history.

(56) References Cited

U.S. PATENT DOCUMENTS

| 4,699,892 A | 10/1987 | Suzuki |
| 5,151,110 A | 9/1992 | Bein et al. |
| 5,843,392 A | 12/1998 | Jansen et al. |
| 2001/0008662 A1 | 7/2001 | Blinka et al. |
| 2002/0110699 A1 | 8/2002 | Yan et al. |
| 2002/0134995 A1 | 9/2002 | Yan et al. |
| 2005/0070424 A1 | 3/2005 | Chiang et al. |

FOREIGN PATENT DOCUMENTS

| CN | 1389346 A | 1/2003 |
| TW | 067292 | 6/1983 |
| TW | 570934 | 9/1991 |
| TW | 593188 | 9/1991 |
| TW | 571114 | 10/1991 |

(Continued)

OTHER PUBLICATIONS

Naik et al, "Synthesis of silicalite nanocrystals via the steaming of surfactant protected precursors", Microporous and Mesoporous Materials, Apr. 2002, pp. 293-296.*

Primary Examiner—David M Brunsman
(74) Attorney, Agent, or Firm—Birch, Stewart, Kolasch & Birch, LLP

(57) ABSTRACT

An antireflective transparent zeolite hardcoat and fabrication method thereof. The transparent zeolite hardcoat comprises a zeolite nanostructure made of zeolite nanocrystals vertically stacked into a porous structure on a substrate, wherein the porosity increases with structure height thereby providing a smooth refractive index transition. The hardcoat is deposited from a solution comprising the reaction products of a mixture via a two-stage thermal condensation process, wherein the mixture comprises a silica source, water and a zeolite structure directing agent.

6 Claims, 2 Drawing Sheets

| FOREIGN PATENT DOCUMENTS | | | | | |
|---|---|---|---|---|---|
| TW | 1240648 | 9/1992 | TW | 544528 | 11/2001 |
| TW | 578004 | 8/2000 | TW | 200423225 | 11/2004 |
| TW | 569031 | 8/2001 | | | |

* cited by examiner

ANTIREFLECTIVE TRANSPARENT ZEOLITE HARDCOAT, METHOD FOR FABRICATING THE SAME

This application is a Divisional of application Ser. No. 11/300,331 filed on Dec. 15, 2005, now U.S. Pat No. 7,381,461, issued Jun. 3, 2008, and for which priority is claimed under 35 U.S.C. §120; and this application claims priority of Application No. 094123697 filed in Taiwan, R.O.C. on Jul. 13, 2005 under 35 U.S.C. §119; the entire contents of all are hereby incorporated by reference.

BACKGROUND OF THE INVENTION

1. Field of the Invention

The present invention relates to an antireflective film and fabrication method thereof, and more particularly to an antireflective transparent zeolite hardcoat and fabrication method thereof.

2. Brief Discussion of the Related Art

Antireflective film is generally disposed on an outermost surface of an image display device such as polarizing film for a liquid crystal display (LCD), the front plate of a touch panel (PET substrate), the front plate of a projection television (PC substrate), the front plate of a cathode ray tube display or plasma display panel (glass substrate), or an optical lens, to reduce reflectance and prevent optical interference or image glare caused by external light and enhancing the visibility of image.

Two principles have been developed to suppress reflection and increase light transmission. One is the use of optical Two principles have been developed to suppress reflection and increase light transmission. One is the use of optical destructive interference. The Anti-reflective films, working on the principle of destructive interference, have a film thickness (d) and a refractive index ($n_1$). For complete cancellation of the incident light reflection, the product of the film thickness and the refractive index must be one quarter or higher odd multiple (m) of the incident light wavelength (λ). The equation of the above is:

$$n_1 d = m\lambda/4$$

A monolayer film can reduce the reflection of light at a single wavelength, but more often a multi-layered film comprising several transparent layers is used to reduce reflection over a wide wavelength region. For such a structure, half wavelength layers are alternated with quarter wavelength layers to improve performance. However, formation of this multi-layered film requires a complicated process comprising a number of dry (such as vapor deposition or sputtering) and/or wet procedures (such as dip, spin, or print coating), causing mass production to be expensive.

The other means for broadening the antireflection capabilities is to grade the refractive index. The Antireflective film having a gradient refractive index causes incident light to progress through the film along a meandering path, without reflection caused by a sharp change of refractive index. Particularly, a single-layer Antireflective film having a gradient refractive index can be obtained by various method, such as etching, sol-gel, phase separation, micro-imprinting or molding, providing high yield, simple fabrication process, and low cost.

SUMMARY OF THE INVENTION

The invention provides a solution, capable of forming an antireflective transparent zeolite hardcoat, comprising the reaction products of a mixture via a two-stage thermal condensation process, wherein the mixture comprises silica source, water, and zeolite structure directing agent (SDA).

Methods for fabricating an antireflective transparent zeolite hardcoat of the aforementioned composition are provided, in which the solution capable of forming an antireflective transparent zeolite hardcoat is provided. Before coating, the concentration of the solution is modified to a specific range. A coating of the modified solution is formed on a substrate. The substrate is heated to transform the coating into a transparent zeolite hardcoat, under a less than saturation humidity condition. Since the coating of the above solution can be transformed into a transparent zeolite hardcoat at a temperature less than 140° C., the coating can be further formed on an optical plastic substrate.

The obtained antireflective transparent zeolite hardcoat comprises a zeolite nanostructure made of nanocrystals vertically stacked into a porous structure on a substrate, wherein the porosity increases with structure height, thereby providing a smooth transition of refractive index. The zeolite hardcoat presents transparent and exhibits a superior mechanical strength due to the zeolite nanocrystals.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE PREFERRED EMBODIMENTS

Zeolite, which is a member of a family of minerals known as tectosilicates, is microporous crystalline material with high internal surface area formed by three-dimensional open framework of tetrahedral $SiO_4$ units connected by oxygen atoms thereof.

Although the three-dimensional framework structure of zeolite, as well as the resulting pore size and volume of crystal structure thereof, differs from case to case, the pore size in general falls in the range of 0.3 to 1.0 nm. Due to the molecular sized pore structure, zeolite is frequently used as a molecular selective catalyst and adsorbent. In such applications, zeolite is usually employed in the form of powder, pellet and even other particle forms.

Zeolite in the form as polycrystalline film on a porous substrate has been disclosed for various membrane applications. U.S. Pat. No. 4,699,892 describes the preparation of a permeable composite zeolite membrane for the selective separation of materials.

In addition to a zeolite membrane, a zeolite film coated on a non-porous substrate also finds applications. U.S. Pat. No. 5,151,110 zeolite was coated on piezoelectric substrate for nanogram level detection of chemicals. U.S. Pat. No. 5,843,392 described the coating of substantially orientated zeolite crystals on structured support for catalytic purpose. U.S. patent application Ser. No. 20010008662 described the combination of oxygen scavenger layer and a zeolite layer as an active oxygen barrier packaging materials. U.S. patent application Ser. No. 20020110699 disclosed that zeolite coating on a metal surface functions as protection against corrosion. For applications such as protection against corrosion, the zeolite coating must be continuous and without inter-crystalline voids. U.S. patent application Ser. No. 20020134995 described a zeolite film for the preparation of low dielectric layer on silicon wafer. The conventional zeolite membrane, however, is typically opaque and not suited as an optical element. No reference has so far been made to use zeolite as antireflection or optical film.

A method for making transparent continuous zeolite film is disclosed in U.S. patent application Ser. No. 20050070424 filed by the applicant of this invention.

Figure 1:
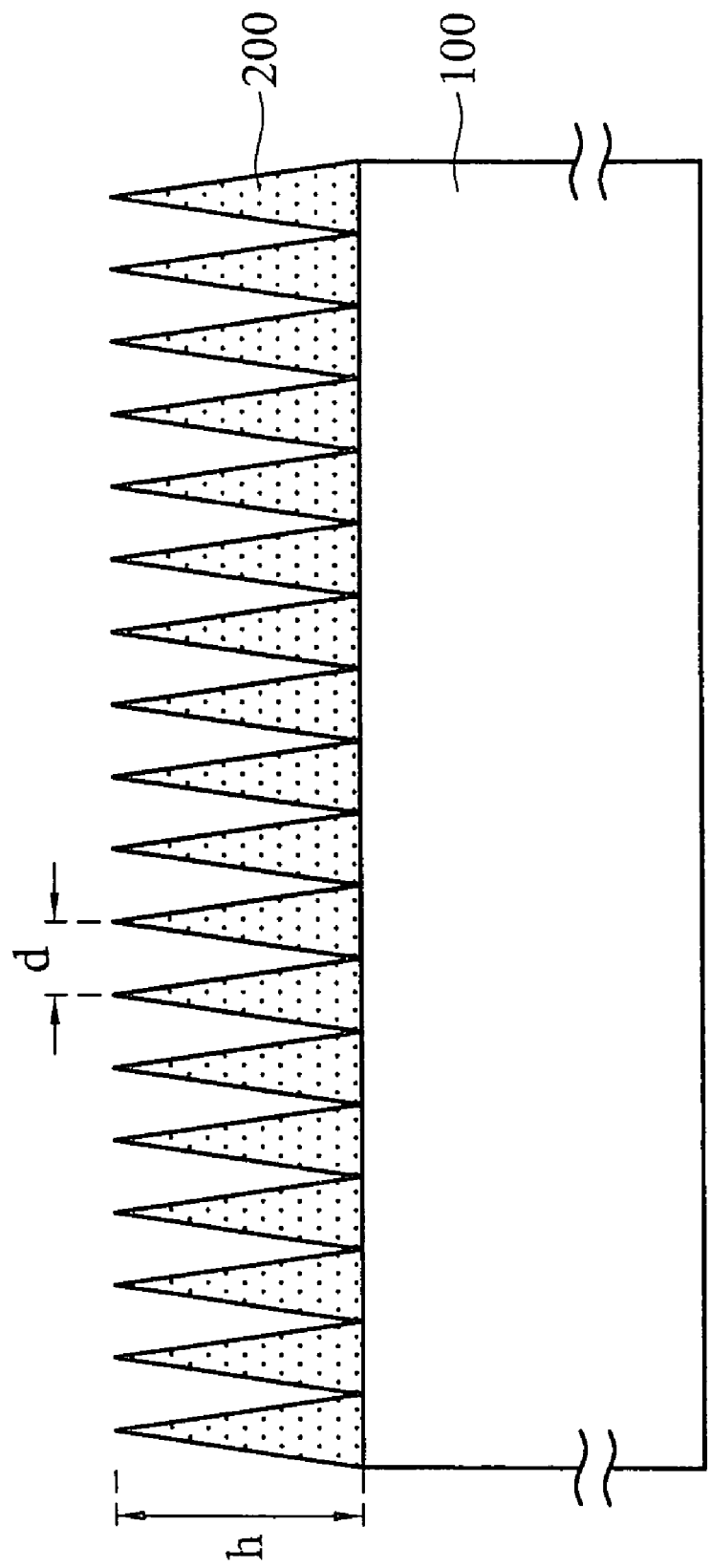
FIG. 1 is a schematic diagram of zeolite nanostructure according to an embodiment of the invention.

According to the invention, since the nanostructure of zeolite hardcoat comprising a plurity of nanopores, the single-layer antireflective transparent zeolite hardcoat has a gradient refractive index, further obtaining a low reflectance. Furthermore, the zeolite hardcoat can be formed at a low temperature (less than 100° C.), suitable to serve as an antireflection hardcoat not only for glass but also plastic substrates. The substrate can be silicon wafer, glass, plastic sheet, or plastic optical film. As shown in FIG. 1, the antireflective transparent zeolite hardcoat 200 with a wave-shaped profile, made of nanocrystals vertically stacked into a porous structure on a substrate 100, has a plurality of vertical openings. Specifically, since the porosity of the hardcoat generally increases with structure height h, the zeolite hardcoat 200 has gradient refractive index. The profile of the zeolite nanostructure is illustrated as an example, but not intended to be limitative of the invention, and can be taper-shaped or cone-shaped. Further, the top of the zeolite nanostructure can be pointed, flat, or rounded. The zeolite nanocrystals have a plurality of nanopores distributed uniformly thereover and presents a sponge-like profile. Due to the nanopores being sufficiently filled by air, the refractive index can be further reduced due to destructive interference.

According to the invention, the nanostructure has a space d less than one quarter of incident wavelength, preferably less than one tenth. Namely, the space d (zeolite nanocrystals size) is less than 100 nm, preferably 50 nm. Further, the height h of the zeolite hardcoat 200 is between 30-300 nm. Thus, the zeolite hardcoat 200 presents transparent and exhibits antireflection properties. Moreover, the zeolite hardcoat 200 is made of inorganic nanocrystals, achieving sufficiently high scratch resistance and hardness. Even coating on the plastic substrate, the zeolite hardcoat has a pencil hardness greater than 3 H, often between 3 H to 6 H depended on which type of substrates were used.

The method for fabricating antireflective transparent zeolite hardcoat is described in detail in the following. First, a solution capable of forming an antireflective transparent zeolite hardcoat is provided. The solution comprises the reaction products of a mixture via a two-stage thermal condensation process, wherein the mixture comprises silica source, water, and zeolite structure directing agent (SDA). The first stage thermal condensation process can be performed at a temperature less than 100° C., such as 80° C. for 13~30 hours. To improve the crystallinity of silica particles, the second stage thermal condensation process can be performed at a temperature between 150~200° C. for 1~2 hours. It should be noted that, after the thermal condensation process, the weight concentration of silica source is 20-40 wt %, based on the weight of the solution. The silica source can comprise $C_{1-2}$ alkyl orthosilicate, such as ethyl orthosilicate. The zeolite structure directing agent (SDA) can be quaternary ammonium hydroxide, such as tetrapropylammonium hydroxide. The mixture can further comprise a metal source or a halide to obtain hydrophilic or hydrophobic zeolite hardcoat optionally.

Next, the concentration of the solution is modified by concentrating or diluting with a solvent. Specifically, the weight concentration of silica source can be modified to 0.01-6 wt %, preferably 0.5-1%, based on the weight of the modified solution. The diluting solvent can comprise a mixture of water and an alcohol containing less than 6 carbon atoms. Further, the concentration of the solution can be modified by adding a surfactant thereinto, resulting in controllable crystal arrangements. The surfactant is ionic or nonionic surfactant and can be nonionic surfactant of diblock copolymer of polyethylene oxide and polypropylene oxide, cationic surfactant of quaternary ammonium salt, or anionic surfactant of organic sulfonate, in an amount of less than 10 grams per liter of the solution volume.

Next, a coating of the modified solution is formed on a substrate by spin coating, dip coating, slot die coating, roll coating, blade coating, spray coating, micro-gravure, meniscus, or web tension. After optional evaporation of diluting solvent, the substrate is heated at 70-150° C. to transform the coating into a transparent zeolite hardcoat under a less than saturation humidity condition. Since zeolite hardcoat can be formed by heating at a low temperature, the substrate are unlimited and can be silicon wafer, glass, plastic, or plastic optical film heated at a low temperature to transform into a transparent.

In an embodiment of the invention, the substrate is subjected to a first heating treatment at 70-140° C. under more than 70% relative humidity for 3-30 minutes and an optional second heating treatment at 70-80° C. under 30-98% relative humidity for 2-3 hours, in a steam oven. The obtained zeolite hardcoat is transparent and of high-silica MFI zeolite or pure-silica MFI zeolite.

It should be noted that the heating temperature can be less than 100° C. for a plastic substrate and between 350-550° C. to eliminate organics for a glass substrate. As a main feature and a key aspect, the coating solution, capable of forming an antireflective transparent zeolite hardcoat, must have a specific silica weight ratio and be heated under a less than saturated humidity condition.

The following examples are intended to demonstrate this invention more fully without limiting its scope, since numerous modifications and variations will be apparent to those skilled in the art.

EXAMPLE 1

41.6 g of tetraethoxysilane (TEOS,>98%) was dissolved in 25.4 g of aqueous tetrapropyl ammonium hydroxide (TPAOH, 40% aq) and 20.8 g of deionized water. The mixture was stirred under room temperature for about 90 minutes to obtain a clear precursor solution A, wherein the molar ratio between TEOS, TPAOH, and water was 1:0.25:10 and the silica present in an amount of 13.68 wt %.

The 87.75 g precursor solution A was then concentrated at 80° C. slowly to a clear viscous sol. The heating of the viscous sol continued for 18 hours, and resulted in 35.29 g of clear colloid silica sol. Assuming all ethanol as well as some of the water was removed, the amount of silica present in the clear colloid sol was 34 wt %. The TPAOH present in an amount of 28.76 wt % and the balance was water. Accordingly, the molar ratio between silica, TPAOH, and water was 1:0.25:3.65. Finally, the clear colloid silica sol was hydrothermally treated at 150° C. for 2 hours to obtain silica colloid A.

Next, the silica colloid A was diluted with 95% ethanol to obtain a solution B with 10 wt % silica. The solution B was diluted to 0.7 wt % silica and measured by laser scattering system, and the average particular dimension was 68.7 nm (with a standard deviation of 0.5 nm), and FWHM (full width. half maximum) 12.2 nm (with a standard deviation of 1.9 nm).

1 g of the solution B was diluted with 27 g of 95% ethanol to produce a coating solution C. In the solution C, silica was present in an amount of 0.357 wt %. Next, the solution C was coated on a triacetyl cellulose (TAC) substrate by blade coating and baked at 80° C. for 2.5 hour, forming a transparent zeolite hardcoat A on the substrate. The transparency of TAC substrate with zeolite hardcoat A was improved from 93.15% to 94.48%, measured by Nippon Denshoku 300A.

COMPARATIVE EXAMPLES 1~3

The solution B as disclosed in Example 1 was diluted with 95% ethanol and respectively added 0.03 g, 0.10 g, and 0.50 g of non-ionic surfactant Tween-20 to prepare coating solutions D, E, and F, with 0.357 wt % silica. The solutions D, E, and F were coated on TAC substrates by blade coating and baked at 80° C. for 2.5 hours, respectively forming transparent zeolite hardcoats B, C, and D on the substrates. The transparency of zeolite hardcoats B, C, and D were measured by Nippon Denshoku 300A and 93.24%, 92.85%, and 93.15% respectively.

EXAMPLE 2

The coating solution C as disclosed in Example 1 was coated on a TAC substrate by blade coating. Next, the TAC substrate was baked at 80° C. under 90% relative humidity for 2.5 hour, obtaining a transparent zeolite hardcoat E on the TAC substrate. The transparency of the TAC substrate with zeolite hardcoat E was improved from 93.15% to 95.84%, measured by Nippon Denshoku 300A.

EXAMPLE 3

Figure 2:
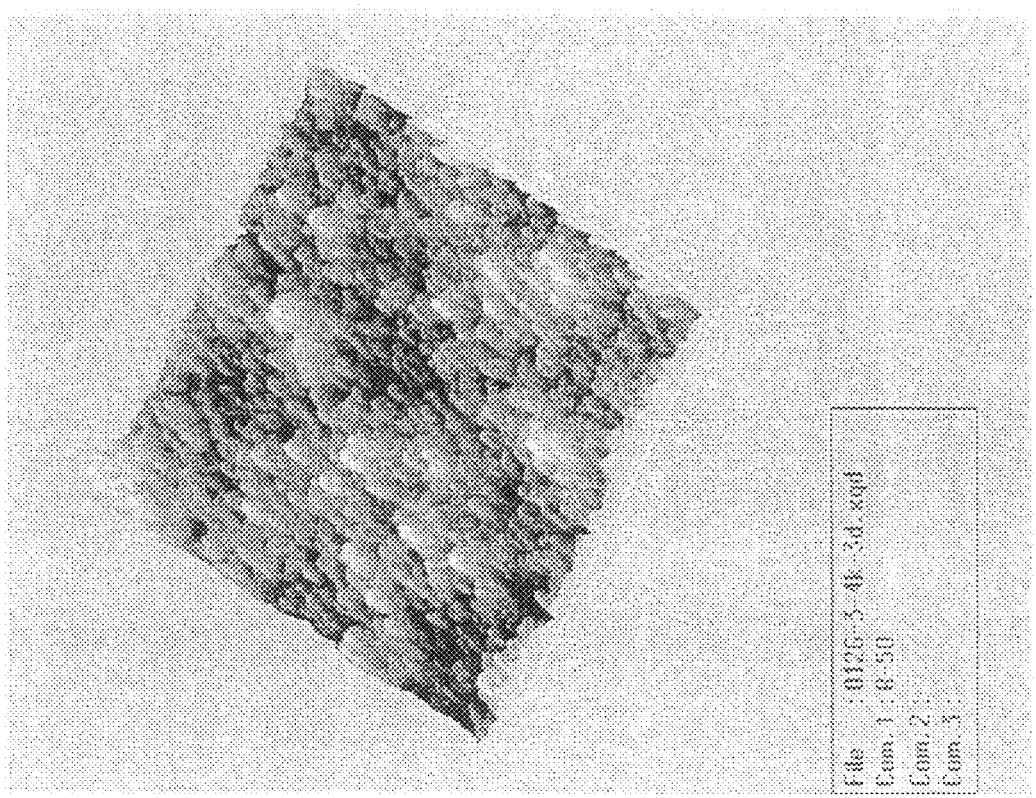
FIG. 2 is an atomic force microscope (AFM) photograph of the antireflective transparent zeolite hardcoat according to Example 3.

2 g of the coating solution B as disclosed in Example 1 was diluted with 27 g of 95% ethanol to produce a coating solution G with 0.689 wt % silica. Next, the solution G was coated on a TAC substrate and baked at 80° C. under 90% relative humidity for 2.5 hour, obtained a transparent zeolite hardcoat F on the TAC substrate. The transparency of TAC substrate with zeolite hardcoat F was improved from 93.15% to 97.08% (measured by Nippon Denshoku 300A), and the reflectivity thereof improved from 8.3% to 5.2% (measured by Perkin Elmer Lambda 900). Moreover, a TAC substrate with the zeolite hardcoat F formed on both sides had a reflectivity of 2%. The surface hardness of the zeolite hardcoat F was between 5 H-6 H, measured through a pencil hardness test conforming to Japan Industrial Standard (JIS) K5600. The haze of the substrate with the zeolite hardcoat F was measured by hazemeter after taber abrasive and 4.8%. FIG. 2, an atomic force microscope (AFM) photograph of the zeolite hardcoat F in Example 3 of the invention, shown the zeolite hardcoat made of nanocrystals vertically stacked into a porous structure.

EXAMPLE 4

In this example, the roll to roll slot-die coater was used to verify this technology to be suitable for continuous wet coating process. In order to improve the adhesion of zeolite layer and PET substrate, the PET substrate was coated with acrylate/silica hybrid primers previously. First, 500 g of the coating solution B was prepared with the same method as disclosed in Example 1, then the solution was diluted with 640 g of 95% ethanol to produce a coating solution H with 6.00 wt % silica. Next, the solution H was coated on PET substrate surface by roll to roll slot-die coater. The coated substrate was baked at 140° C. for 3 minutes and obtained a transparent zeolite hardcoat I with 100 nm thickness layer on the PET substrate. The transparency of PET substrate with zeolite hardcoat I was improved from 91.7% to 94.9% (measured by Nippon Denshoku 300A), and the reflectivity thereof improved from 10.2% to 7.8% (measured by Perkin Elmer Lambda 900).

Accordingly, the invention provides a thin transparent zeolite hardcoat, exhibiting antireflectivity and scratch resistance, suitable for use in a display device.

While the invention has been described by way of example and in terms of preferred embodiment, it is to be understood that the invention is not limited thereto. It is therefore intended that the following claims be interpreted as covering all such alteration and modifications as fall within the true spirit and scope of the invention.

What is claimed is:

1. A solution capable of forming an antireflective transparent zeolite hardcoat, comprising the reaction products of a mixture via a two-stage thermal condensation process, wherein the mixture comprises silica source, water, and zeolite structure directing agent (SDA), wherein the first stage thermal condensation process is performed at a temperature less than 100° C. for 13~30 hours, and the second stage thermal condensation process is performed at a temperature between 150~200° C. for 1~2 hours, and the silica source is present in an amount of 20~40 parts by weight, based on the 100 parts by weight of the mixture.

2. The solution as claimed in claim 1, wherein the mixture further comprises a metal source and halide.

3. The solution as claimed in claim 1, wherein the molar ratio between the zeolite structure directing agent and silica source is 0.2~0.6.

4. The solution as claimed in claim 1, wherein the silica source comprises $C_{1-2}$ alkyl orthosilicate.

5. The solution as claimed in claim 1, wherein the zeolite structure directing agent comprises quaternary ammonium hydroxide or salts thereof.

6. The solution as claimed in claim 1, wherein the silica source is ethyl orthosilicate and the zeolite structure directing agent is tetrapropylammonium hydroxide.

* * * * *